United States Patent [19]

Justice et al.

[11] 4,001,038

[45] Jan. 4, 1977

[54] METHOD OF STRIPPING PAINT IN A MOLTEN SALT BATH

[75] Inventors: Timothy R. Justice, Inkster; Robert W. Foreman, Bloomfield Hills, both of Mich.

[73] Assignee: Park Chemical Company, Detroit, Mich.

[22] Filed: July 1, 1975

[21] Appl. No.: 592,103

[52] U.S. Cl. .................... 134/38; 252/99; 252/103; 252/DIG. 8

[51] Int. Cl.² .................................. B08B 3/08

[58] Field of Search .......... 134/2, 38; 252/99, 103, 252/156, DIG. 8; 148/6.11

[56] References Cited

UNITED STATES PATENTS

| | | | |
|---|---|---|---|
| 2,359,913 | 10/1944 | Hill .................... | 252/156 X |
| 3,000,766 | 9/1961 | Wainer .................... | 134/38 X |
| 3,030,239 | 4/1962 | Mekjean et al. .................... | 252/156 X |
| 3,790,489 | 2/1974 | Shoemaker et al. .................... | 134/38 X |
| 3,899,322 | 8/1975 | Yosim et al. .................... | 134/38 X |

*Primary Examiner*—S. Leon Bashore
*Assistant Examiner*—Marc L. Caroff
*Attorney, Agent, or Firm*—Harness, Dickey & Pierce

[57] ABSTRACT

Paint-coated objects are immersed in a molten salt bath to remove paint therefrom. The bath contains in weight percent: a) about 25–90% of alkali or alkaline earth caustic compounds; b) about 2–10% of an oxidizing agent selected from the group consisting of alkali and alkaline earth metal nitrates, nitrites, molybdates, metasilicates, and vanadates; c) about 5–40% of a surface scum reducing agent selected from the group consisting of alkali and alkaline earth metal sulfates and pyrophosphates; d) 0–60% of diluent salt selected from the group consisting of chloride, carbonate, and fluoride salts.

9 Claims, No Drawings

METHOD OF STRIPPING PAINT IN A MOLTEN SALT BATH

BACKGROUND OF THE INVENTION

This invention broadly relates to a new paint stripping molten salt bath composition and method of using same.

The state of the art is indicated by the following U.S. Pat. Nos.: Lang, 1,714,879; Hannah, 2,898,246; Wilson, 3,168,477; Rausch, 3,425,947; Ng, 3,690,949; Shoemaker, 3,790,489; Faler, 3,393,689; Shoemaker, 3,260,619; Faler, 3,174,491; Faler, 3,126,301; Shoemaker, 3,024,139; Shoemaker, 2,967,530; Webster, 2,936,270; Shoemaker, 2,936,278; Webster, 2,847,374; Shoemaker, 2,863,465; Wainer, 3,615,815; Seibert, 3,455,737; Schwartz, 2,939,209; Wainer, 3,000,766; Kemper, 3,770,501; Moore et al., 18,242; O'Reilly, 3,448,509; Pajes, 2,854,360; Sundh, 1,412,978, and U.S. Patent 3,647,358.

Prior formulations for paint stripping salt baths conventionally have been made of molten nitrate/caustic mixtures. However, while these prior formulations generally provided relatively complete combustion of organic compounds they also resulted in the rapid build up of carbonates or solid sludge like materials in the bath, which carbonates and sludge are detrimental to bath operation. If it was attempted to overcome this problem by going to a low nitrate-high caustic salt bath formulation very substantial amounts of tarry or scummy residues were formed in the molten salt bath and this interfered with the paint stripping operation of the bath and it also interfered with the washing of fixtures which had been treated in the bath. Accordingly there has long been desired a salt bath formulation which would provide an essentially complete combustion of the organics or paint material but wherein sludge or carbonate build up would be very small compared with the prior high nitrate formulations, and yet without the problem of the build up of tarry or scummy residues which had occurred when using a low nitrate formulation.

Accordingly one object of the invention is to provide a new and improved paint stripping molten salt composition and method of using same.

Another object of the present invention is to provide a new paint stripping molten salt bath wherein there is obtained essentially complete combustion of organic compounds but without the rapid build up of carbonates or sludge-like material as has occurred in prior salt baths used for paint stripping.

Other objects, features and advantages of the present invention will become apparent from the subsequent description and the appended claims.

SUMMARY OF THE INVENTION

Briefly stated the present invention concerns a salt composition, suitable for use as a paint stripping salt in a molten salt bath which is maintained at a temperature between about 600° and about 1100° F, said composition comprising in weight percent, about 25% to about 90% of caustic material selected from at least one of the group consisting of alkali and alkaline earth caustic materials, about 2% to about 10% of an oxidizing agent selected from at least one oxidizing type material of the group consisting of alkali and alkaine earth metal nitrates, nitrites, molybdates and metasilicates, and vanadates, about 5% to about 40% of a surface scum reducing agent selected from at least one of the group consisting of alkali and alkaline earth metal sulfate and pyrophosphate materials, zero to about 60% of a diluent salt material selected from at least one of the group consisting of the salts of chlorides, carbonates, and fluorides.

From a method aspect briefly stated, the present invention involves a method of using the salt composition described above by providing a molten salt bath made from said composition wherein the temperature is maintained at a temperature between about 600 and about 1100° F (preferably 750° – 950° F) and immersing paint coated objects in the molten salt bath to remove the paint therefrom.

It is not fully understood why the salt bath discovered and disclosed herein provides such unique operation in the way of preventing carbonate build up while at the same time preventing the build up of any tarry or scummy residues in the salt bath or on the bath surface. However suffice it to say that the bath of this invention gives highly satisfactory and advantageous results when used as a paint stripping salt. The scum reducing agent portion of the salt composition apparently synergistically cooperates with the oxidizing agent portion to rid the bath of any tarry or scummy residues, and this occurrence is a major point which renders the salt bath so successful in its commercial function as a paint removing composition.

DESCRIPTION OF PREFERRED EMBODIMENTS

The caustic material used in the salt bath of the invention should generally be a strong caustic such as an alkali or alkaline earth metal caustic material. Particularly suitable materials are sodium hydroxide and potassium hydroxide. The caustic material should generaly be present within the broad range of about 25% to about 90% by weight of the composition and preferably within the range of about 30% to about 70% by weight.

The oxidizing agent used in the invention should be present within the broad range of about 2% to about 10% by weight of the composition and preferably within the range of about 3% to about 8%. The oxidizing agent should generally be a material selected from the group of alkali and alkaline earth metal nitrates, nitrites, molybdates (such as sodium molybdate), and silicates (such as metasilicates), and vanadates (such as vanadium pentoxide). Preferred oxidizing agents are sodium or potassium nitrate and sodium or potassium nitrite.

The tar or scum reducing agent should be a material selected from the group consisting of alkali and alkaline earth metal sulfate or pyrophosphate materials. The preferred materials have been found to be sodium sulfate, potassium sulfate, or tetra sodium pyrophosphate. More broadly stated the scum reducing agent is described as an oxy-acid salt that is not easily reducible to a lower (e.g. lower valence) oxy-acid salt. The scum reducing agent should generally be present within the broad range of about 5% to about 40% by weight of the composition and preferably within the range of about 10% to about 30%.

The diluent salt materials which may be used in the composition may be present within the broad range of zero to about 60% by weight of the composition and preferably it is present within the range of about ½% to about 30% by weight of the composition. This salt material is generally selected from the group consisting of the common alkali and alkaline earth metal salts of the following types, chlorides, carbonates, and fluorides. Typically preferred materials are sodium chloride, potassium chloride, and the like.

The molten salt bath temperature range for use in practicing the invention disclosed herein should generally be within the broad range of about 600° to about 1100° F. Preferably this temperature range should be maintained within the range of about 750° to about 950° F and the best results are obtained within the temperature range of about 850° – 950°.

In order to further illustrate the invention the following examples are provided. It is to be understood however that the examples are included for illustrative purposes and are not intended to be limiting of the scope of the invention as set forth in the subjoined claims.

| Formulating Materials | Example Number (in % by weight) | | | | | | | |
|---|---|---|---|---|---|---|---|---|
| | 1 | 2 | 3 | 4 | 5 | 6 | 7 | 8 |
| Caustic (NaOH) | 55 | 60 | 40 | 75 | 35 | 62 | 62 | 60 |
| $Na_2SO_4$ | 22 | 20 | 20 | | 3 | | 15 | |
| $K_2SO_4$ | | | | 5 | 10 | 2 | | |
| tetra sodium pyrophosphate | | | | | | 15 | | 20 |
| NaCl | 13 | 15 | | 4 | 30 | 15 | 15 | 15 |
| KCl | | | 25 | 3 | 20 | | | |
| $KNO_3$ | 10 | 5 | 10 | 4 | 8 | 8 | | |
| vanadium pentoxide | | | | 2 | 1 | | 4 | 3 |
| sodium molybdate | | | | 2 | 1 | | 4 | 2 |

While it will be apparent that the preferred embodiments of the invention disclosed are well calculated to fulfill the objects above stated, it will be appreciated that the invention is susceptible to modification, variation in change without departing from the proper scope or fair meaning of the subjoined claims.

What is claimed is:

1. A method of using a salt composition as a paint stripping salt, comprising the steps of:
   providing a salt bath composition comprised of in weight percent;
   a. about 25% to about 90% of caustic material selected from at least one of the group consisting of alkali and alkaline earth caustic materials,
   b. about 2% to about 10% of an oxidizing agent selected from at least one oxidizing type material of the group consisting of alkali and alkaline earth metal nitrates, nitrites, molybdates and metasilicates, and vanadates,
   c. about 5% to about 40% of a surface scum reducing agent selected from at least one of the group consisting of alkali and alkaline earth metal sulfate and pyrophosphate materials,
   d. 0 to about 60% of a diluent salt material selected from at least one of the group consisting of the salts of chlorides, carbonates and fluorides,
   maintaining said salt bath in molten form at a temperature from about 600° to about 1100° F;
   immersing paint coated objects in said molten salt bath to remove the paint therefrom.

2. The invention of claim 1 wherein said scum reducing agent is at least one of the group of alkali and alkaline earth metal sulfate materials.

3. The invention of claim 1 wherein,
   a. said caustic material is selected from the group of sodium and potassium hydroxide.

4. The invention of claim 3 wherein, said bath temperature is from about 750° to about 950° F.

5. The invention of claim 1 wherein,
   component (a) is present from about 30% to about 70%,
   component (b) is present from about 3% to about 8%,
   component (c) is present from 10% to about 30%,
   component (d) is present from about 1/2% to about 30%.

6. The invention of claim 2 wherein,
   said bath temperature is from about 750° to about 950° F.

7. The invention of claim 6 wherein,
   component (a) is present from about 30% to about 70%
   component (b) is present from about 3% to about 8%
   component (c) is present from about 10% to about 30%
   component (d) is present from about 1/2% to about 30%.

8. The invention of claim 6 wherein,
   said oxidizing agent is a nitrate material.

9. The invention of claim 7 wherein,
   a. said caustic material is selected from the group of sodium and potassium hydroxide.

* * * * *